US008504196B2

(12) United States Patent
Wiles (10) Patent No.: US 8,504,196 B2
(45) Date of Patent: Aug. 6, 2013

(54) DAIRY PRODUCT AND PROCESS

(75) Inventor: Peter Gilbert Wiles, Palmerston North (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 1063 days.

(21) Appl. No.: 11/995,682

(22) PCT Filed: Jul. 17, 2006

(86) PCT No.: PCT/NZ2006/000177
§ 371 (c)(1),
(2), (4) Date: Jul. 11, 2008

(87) PCT Pub. No.: WO2007/011241
PCT Pub. Date: Jan. 25, 2007

(65) Prior Publication Data
US 2009/0105875 A1    Apr. 23, 2009

(30) Foreign Application Priority Data
Jul. 19, 2005  (NZ) ........................................ 541321

(51) Int. Cl.
*G06F 17/00* (2006.01)
(52) U.S. Cl.
USPC ......................................... 700/233; 700/239
(58) Field of Classification Search
None
See application file for complete search history.

(56) References Cited

U.S. PATENT DOCUMENTS 5,522,309 A * 6/1996 Mizobuchi et al. ............. 99/334
5,803,320 A * 9/1998 Cutting et al. ................ 222/641
5,967,367 A * 10/1999 Orsborn .......................... 222/30
6,622,064 B2 * 9/2003 Bartholomew et al. ....... 700/233
6,759,972 B2 * 7/2004 Gupta et al. .................. 340/994
7,090,638 B2 * 8/2006 Vidgen ........................... 600/300

(Continued)

FOREIGN PATENT DOCUMENTS
WO    WO95/25423 A    9/1995
WO    WO00/11591 A    3/2000

(Continued)

OTHER PUBLICATIONS

Written Opinion of the International Searching Authority, dated Nov. 3, 2006, received in International Application No. PCT/NZ2006/000177, in 3 pages.

(Continued)

*Primary Examiner* — Timothy Waggoner
(74) *Attorney, Agent, or Firm* — Knobbe, Martens Olson & Bear, LLP (57) ABSTRACT

The present invention relates to a system for dispensing a customized serving. The system includes an ingredient storage module 12, an ingredient processing module 18, a serving dispenser 20, a user interface 24, and a formulation database containing an inventory of ingredients stored in the storage module 12 from which potential servings will be formulated. The system also includes a controller 22 that is operatively linked to the storage module 12, the processing module 18, the dispenser 20, the interface 24 and the database. The controller 22 is programmed: (a) to receive a serving selection from the user; (b) to determine, using the database, a serving recipe that best approximates the user's serving selection; (c) to present the serving recipe to the user via the interface 24, and (d) upon a command from the user, to actuate the processing module 18 to prepare, and the serving dispenser 20 to dispense, a serving prepared from the serving recipe.

47 Claims, 5 Drawing Sheets

U.S. PATENT DOCUMENTS

| | | | |
|---|---|---|---|
| 7,295,889 B2 * | 11/2007 | Lahteenmaki | 700/233 |
| 7,455,867 B1 | 11/2008 | Gutwein et al. | |
| 7,762,181 B2 * | 7/2010 | Boland et al. | 99/322 |
| 2005/0048461 A1 | 3/2005 | Lahteenmaki | |
| 2009/0136632 A1 | 5/2009 | Gutwein et al. | |

FOREIGN PATENT DOCUMENTS

| | | |
|---|---|---|
| WO | WO 01/12038 | 2/2001 |
| WO | WO02/12112 A | 2/2002 |
| WO | WO03/005295 A | 1/2003 |
| WO | WO 03/056493 | 7/2003 |
| WO | WO2004/010799 A | 2/2004 |
| WO | WO2004/036515 A | 4/2004 |
| WO | WO2004/086165 A | 10/2004 |
| WO | WO2007/011241 A1 | 1/2007 |

OTHER PUBLICATIONS

International Search Report, dated Nov. 3, 2006, received in International Application No. PCT/NZ2006/000177, in 4 pages.

Search Report dated Jan. 25, 2010 for European Application No. 06769484.4 for corresponding International Application No. PCT/NZ2006000177.

* cited by examiner

| | | | |
|---|---|---|---|
| Na | 0.0046 | 0.0018 | 0.19 |
| Ca | 1.2 | 0.48 | 120 |
| Fe | 0.011 | 0.0044 | 61 |
| Mg | 0.46 | 0.18 | 120 |
| Zn | 0.015 | 0.006 | 100 |
| Vit_A | 3.7E-006 | 1.5E-006 | 0.25 |
| Vit_B1 | 0.0014 | 0.00056 | 93 |
| Vit_B2 | 0.0015 | 0.0006 | 88 |
| Vit_B6 | 0.0012 | 0.00048 | 60 |
| Vit_B12 | 5.4E-006 | 2.2E-006 | 90 |
| Vit_C | 0.054 | 0.022 | 90 |
| Vit_D | 8.1E-006 | 3.2E-006 | 81 |
| Vit_E | 0.018 | 0.0072 | 90 |
| Niacin | 0.018 | 0.0072 | 90 |
| Pantothenate | 0.0091 | 0.0036 | 91 |

The price of your selection is $1.64

Your order code is de3nACVgxuPuw

If you would like to change your formulation, click on Back.

Happy with your selections! then click on For Outlet Locations in Your Area.

FIGURE 7

DAIRY PRODUCT AND PROCESS

REFERENCE TO RELATED APPLICATIONS

The present application is the U.S. National Phase of International Application PCT/NZ2006/000177, filed Jul. 17, 2006 and claims priority to New Zealand Patent Application Number NZ 541321, filed Jul. 19, 2005. Each of the priority applications is hereby incorporated by reference in its entirety.

BACKGROUND OF THE INVENTION

1. Field of Invention

This invention relates to a system for dispensing a customised serving. More particularly, it relates to a system that has stored ingredients, a serving preparation and dispensing facility and is programmed to dispense a serving customised to a user's preferences.

2. Background Art

WO01/12036 describes a device for dispensing customised coffee or tea beverages. The beverages are prepared from ingredients stored within the device. The device has a customer database. It is programmed to offer beverage choices, through a customer interface to a customer, based on past selections made by that customer together with choices made by the customer at the time of purchase.

In U.S. Pat. No. 6,510,430 there is described an internet based system for compiling a customised nutrient formulation. This is done by interrogating the customer with health questions. The recommendation finally accepted by the customer at the end of the interrogation is the customised nutrient formulation. This then forms the basis for the customer to order a nutrient supplement having that formulation. The system itself does not prepare a supplement from stored ingredients.

A nutrition dispenser is described in WO03/056493 wherein a database accumulates information about the health and food intake of an individual. When a customer requests a nutrient or medical dose, the controller of the device makes decisions according to the past health and food-intake behaviour and the customer's current health status in the selection of the ingredients making up the nutritional dose. It then prepares and dispenses the optimised dose.

In US 2004/0238555 there is described a sandwich vending machine. In this machine, the controller is programmed to control all of the sandwich making and delivery functions. The customer is able to specify the type of sandwich through a customer interface. Customer choice is limited to predetermined sandwich types that the device is able to prepare.

Froseth in US2002/0004749 discloses a very general food product customisation system. This system does not teach how to prepare food products from a limited set of ingredients located at the point of sale (self contained vending machine). Froseth does not disclose algorithms to resolve ingredient or nutritional conflicts. Froseth does not disclose how to deal with anonymous users in terms of catering to their nutritional desires, tastes and health needs in a way that is unique to each customer.

It is an object of at least one embodiment of the invention to provide a customised serving preparation and dispensing system which allows for customer interaction in selecting a customised serving according to their tastes while preserving their anonymity.

SUMMARY OF THE INVENTION

Accordingly, in a first aspect, the invention consists in a system for dispensing a customised serving which comprises:

an ingredient storage module,
an ingredient processing module,
a serving dispenser,
a user interface,
a formulation database containing an inventory of ingredients stored in the storage module and potential servings to be formulated therefrom, and
a controller, operatively linked to the storage module, the processing module, the dispenser, the interface and the database;
the controller being programmed:
  a) to receive a serving selection from a user via the interface;
  b) to determine, using the database, a serving recipe that best approximates the user's serving selection,
  c) to present the serving recipe to the user via the interface, and
  d) upon a command from the user, to actuate the processing module to prepare, and the serving dispenser to dispense to the user, a serving prepared from the serving recipe.

In a second aspect, the invention consists in a system for dispensing a customised serving which comprises:
an ingredient storage module,
an ingredient processing module,
a serving dispenser,
a user interface,
a formulation database containing an inventory of ingredients stored in the storage module and potential servings to be formulated therefrom, and
a controller, operatively linked to the storage module, the processing module, the dispenser, the interface and the database;
the controller being programmed:
  a) to interrogate a user through the interface to make a serving selection, and to receive the selection made,
  b) to interrogate the database to determine a serving recipe that best approximates the customer selection,
  c) to present the recipe as determined to the user through the interface with the options of accepting or refining the user selection,
  d) if the user chooses the refining option to repeat steps a) to c), and
  e) if the user chooses the accepting option, to actuate the processing module to prepare, and the serving dispenser to dispense a serving prepared from the accepted serving recipe.

In one embodiment the controller is further programmed to determine a serving recipe from information stored on a machine-readable medium that is presented by the user. The controller is preferably also programmed to determine, using the database, whether the ingredients required for the serving recipe determined from the information stored on the machine-readable medium are available from the storage module. Where one or more ingredients are not available, the controller is preferably programmed to provide the user with alternative ingredients or a reduced set of recipe choices for which resources are adequate or to allow the user to vary the serving recipe.

In one embodiment the ingredient processing module and the serving dispenser are integral with one another.

In one embodiment the serving dispenser is at least partly operated by a customer or by an operator.

In one embodiment the user interface is at a location remote from the other components of the system.

In one such embodiment when a user in step e) has accepted a serving recipe the controller sends a serving specific identifier to the user to be used to release a serving from the serving dispenser.

In another embodiment the controller also sends the location of the nearest dispensing machine or the locations of machines in an area.

In one embodiment the serving recipe presented to a user includes information about the nutritional values of the ingredients chosen.

In another embodiment the controller selects ingredients to formulate a serving optimised to meet nutritional requirements within the constraints of other requirements.

In a further embodiment the other requirements include requirements that certain ingredients are not included together at incompatible levels and that the serving comprises sufficient but not excessive liquid ingredients in a way that departs as little as possible from nutritional targets, that matches as closely as possible the customer's preferred flavour choices, and that is as inexpensive as possible.

In one embodiment the ingredient storage module comprises a plurality of storage compartments.

In one embodiment some of the compartments contain powdered ingredients such as dairy powders or flour or other grain based food product.

In another embodiment some of the compartments contain stabilisers, hydrocolloids or emulsifiers.

In another embodiment some of the compartments contain condiments such as spices, herbs or salt.

In another embodiment some of the compartments contain nutrients such as vitamins, minerals or bioactives.

In another embodiment some of the compartments contain flavourings or flavour modifiers.

In another embodiment some of the compartments contain texturing ingredients.

In another embodiment some of the compartments contain liquids such as water, juice, milk or other potable liquids.

In another embodiment some of the compartments contain gels or emulsions.

In another embodiment some of the compartments contain dried fruit or vegetables, or fruit or vegetable extracts.

In another embodiment some of the compartments are chilled or frozen.

In another embodiment some of the compartments are heated.

In another embodiment the ingredient storage module contains a dosing means for dosing predetermined amounts of ingredients stored in compartments into a serving.

In another embodiment there is provided ingredient advancing means for moving ingredients from the ingredient storage module to the ingredient processing module.

The ingredient advancing means is one or more of mechanical, gravity, vacuum, air pressure, and liquid pressure.

In one embodiment the ingredient processing module contains one or more of a mixer, a heater, a cooler or a freezer.

In one embodiment the heater is a convection heater, microwave heater, pasteuriser, irradiator, ohmic heater or high frequency sound.

In one embodiment the serving dispenser is a nozzle.

In another embodiment, the serving dispenser is an extruder, which may optionally be heated.

In another embodiment there is provided a means for dispensing containers or other receptacles to be in registry with the dispensing nozzle to receive servings from the serving dispenser.

In one embodiment the controller is operatively linked to one or more servers each having stored in its memory at least some of the inventory of ingredients in the storage module and possible servings available therefrom, and nutritional and health data relating to ingredients in the storage module and possible servings therefrom.

In one embodiment the controller and/or server is operatively linked to an external database.

In another embodiment the external database contains information on health and nutrition.

In one alternative the user interface is a touch panel or keyboard integral with the dispensing system.

In another alternative the user interface is a cell phone or portable communication device operable from a location remote from the dispensing system.

In another alternative the user interface is a customer computer operatively linked through to the internet to the system.

In another alternative a manager of the system is able to receive and dispatch information concerning the operational state of the dispensers via an administration interface.

In a further alternative the user interface is a card reader which reads information digitally, graphically or magnetically stored on a card presented by a customer.

In a further alternative the controller is programmed to store the serving recipe in a machine-readable medium that is presented by the user, or that is presented to the user via the user interface, or had been selected by the user on a previous occasion. In this form, the controller is programmed to receive at least part of the serving recipe from information that is digitally, graphically or magnetically stored on a card.

In one alternative the controller is operatively linked to a billing function.

In one alternative the billing function is operatively linked to an electronic crediting/debiting system.

In another embodiment the billing function is actuable by the insertion of coins, banknotes, prepaid electronic cards, an internet payment facility or the like.

In another embodiment the invention is a network of systems as defined above operatively linked to one or more servers.

In another embodiment the invention consists in an apparatus for dispensing customised nutritional servings, which apparatus comprises the combination of components of the system and/or network herein above described.

"Serving" as used in this specification includes not only a ready to consume serving of a beverage or a food, but also concentrates, sauces, toppings, condiments, or premixes which a consumer can take away to add to or use to prepare other servings.

"Tastes" as used in this specification refers to the sensory aspects of a food product such as hot or cold, salty, sweet, sour, bitter, fragrant, chewy etc., but also includes aspects of the user's wellbeing such as certified organic products and ingredients and includes aspects of wellness (health) that can be influenced by food and nutrient selection and customisation, and additionally includes the ability to tailor a food serving according to price, or any combination of these aspects.

"User" means a person who uses the system according to the invention, and includes casual customers who pay on a per use basis as well as users who may have purchased a device or who have access to a device intended for use other than pay as you go use. The terms "user" and "customer" are used interchangeably.

The term "comprising" as used in this specification and claims means "consisting at least in part of", that is to say when interpreting statements in this specification and claims which include that term, the features, prefaced by that term in each statement, all need to be present but other features can also be present.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

DETAILED DESCRIPTION OF THE DRAWINGS

Figure 1:
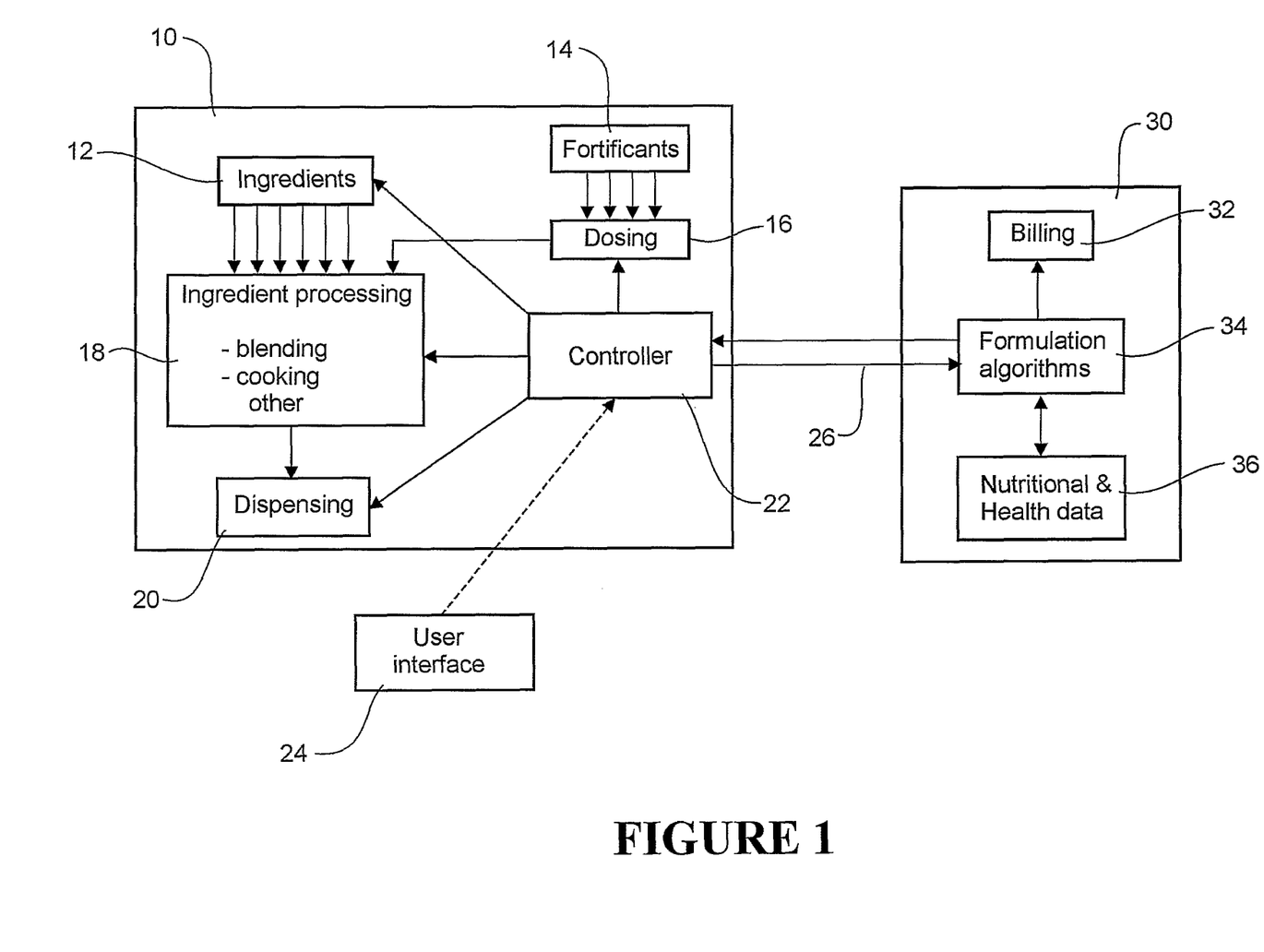
FIG. 1 is a schematic diagram of a system according to the invention.

A first embodiment of the system of the invention is illustrated in FIG. 1, a nutrition dispensing device 10 is made up of an ingredient module 12, a fortificant module 14, a dosing module 16 and an ingredient processing module 18. Downstream from the ingredient processing module 18 is a serving dispenser 20. Operatively connected to each of these modules is a controller 22. A user interface 24 is in operative connection with the controller 22. The user interface 24 may be an integral component of the device 10 or it may be in a location remote from the device.

Controller 22 in the embodiment illustrated is operatively connected through connection 26 to remote server 30. The components in server 30 may be integral with controller 22 in another embodiment of the invention. In server 30 is a billing module 32, formulation algorithms 34 and health and nutrition data 36 concerning the ingredients and fortificants stored within the ingredient and fortificant modules illustrated in FIG. 1.

In one form, the wellbeing and nutrition data 36 are stored as codified values in a database. The codified values may be used to represent a plurality of health related conditions in dedicated fields in a health-nutrition table or array. An example health-nutrition table is shown below:

value greater than 1 implies an enhancement of that nutrient for that condition. By using such a codified health-nutrition table, the device 10 may determine, in a computationally-efficient manner, customised nutritional information for a serving selected by the user.

Figure 2:
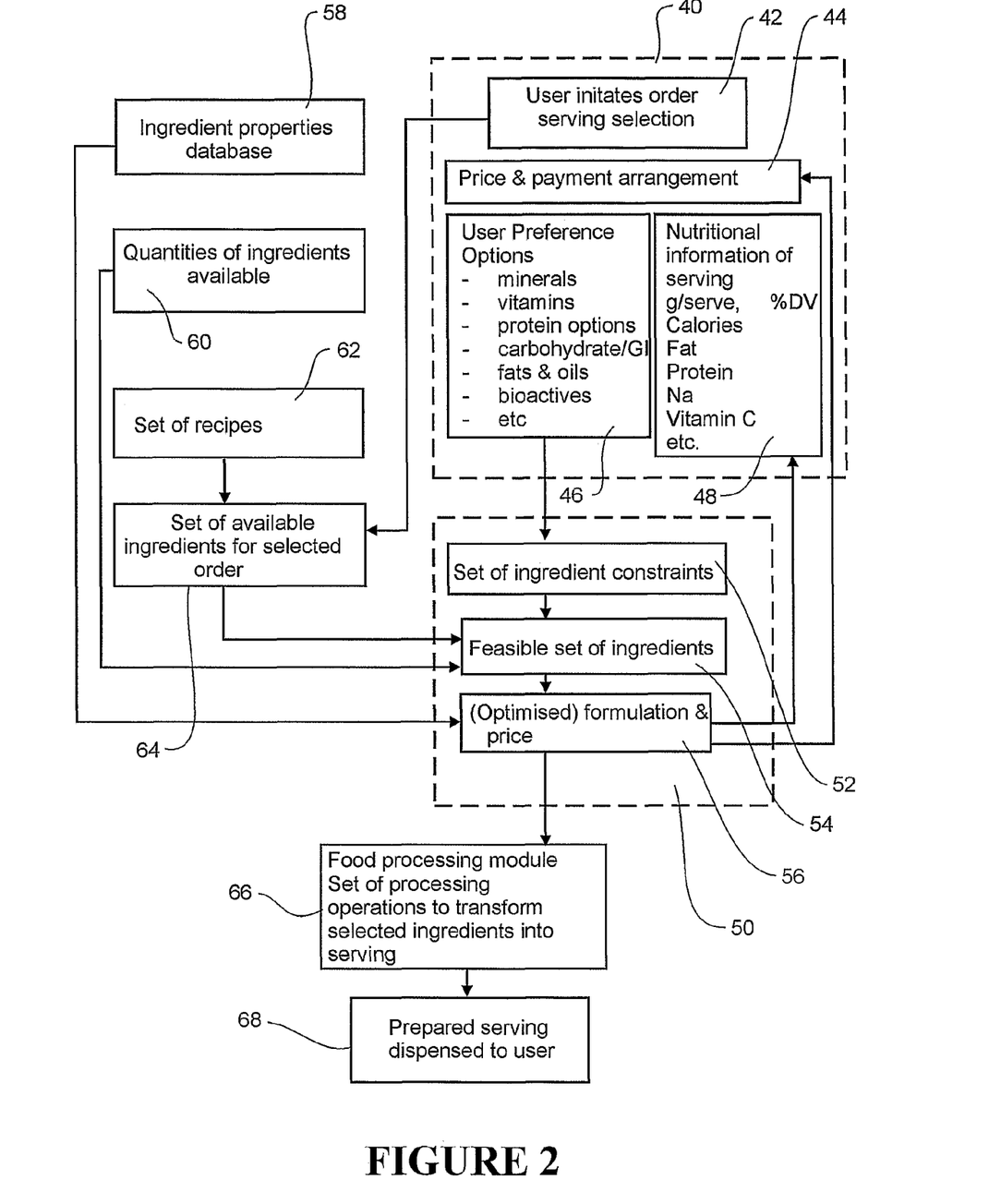
FIG. 2 is a schematic representation of the operation of the system illustrated in FIG. 1.

In FIG. 2 there is illustrated schematically a user interface 40 and a controller 50. In a first step 42 the user initiates an order for a serving selection. This order is compared to the set of available ingredients 64, the set of recipes 62, the quantities of ingredients 60 and the properties of those ingredients 58. The user's preference options 46, nutritional information of the ingredients 48, and the set of ingredients constraints 52 are compiled into a feasible set of ingredients 54 which is then optimised at 56 and referred back as a recipe to the customer. The customer will either accept or ask for change in the formulation. The readout given to the customer will optionally include nutritional information of the serving and other health related data.

Where the system has incorporated into it a billing function the customer will be given a purchase price for the selection being considered generated in the price and billing arrangement 44.

Although in one embodiment the system does incorporate a billing function when it is set up as a pay as you use operation, the system can equally be used in homes or institutions where payment is not required on an as you use basis.

Once the customer has accepted the selection the controller, in one form, actuates the food processing module 66 which then produces the selected serving which is then dispensed at 68 for retrieval by the user. Alternatively or additionally, the controller 50 is adapted to provide the user with a machine-readable form of the recipe. The machine-readable recipe may be stored on a machine-readable medium that is provided to the user by the device, or a machine-readable medium that is provided by the user via the user interface. In a preferred form, the machine-readable medium is in a card form, such as a smart card. In a further alternative, the controller 50 is adapted to provide the user with a machine-readable product reference code that when submitted at some future occasion enables the controller to retrieve the user specific formulation from a database. In a preferred form the product reference code may be printed on the billing receipt or dispensed product packaging and may be issued as a bar code.

| Component (dose units) | RDI, DV, dose | Male | Female Normal | Female Lactating | Age 30-50 | Age 55-65 | Anaemia Low | Anaemia High |
|---|---|---|---|---|---|---|---|---|
| Energy (kcal) | 2000 | 1.15 | 0.92 | 1.15 | 1 | 1 | 1 | 1 |
| Protein (g) | 40 | 1.6 | 1.15 | 1.67 | 1 | 1 | 1 | 1 |
| Calcium (g) | 1.0 | 1 | 1.2 | 1.4 | 1 | 1.1 | 1 | 1 |
| Iron (g) | 0.018 | 0.8 | 1.56 | 1.8 | 1 | 1 | 1.2 | 1.5 |
| Sodium (g) | 0.8 | 1 | 1 | 1 | 1 | 0.85 | 1 | 1 |
| Vitamin C (g) | 0.04 | 1 | 1 | 1.3 | 1.15 | 1.15 | 1 | 1 |
| Etc. | | | | | | | | |

The codified values registered in the fields of the health-nutrition table above are multiplier values for the listed health conditions. The multiplier value is obtained by dividing the dose that is required for that condition by a standard dose. In one embodiment, multiplier values may be constrained to be greater than zero. A multiplier value less than 1 implies a reduction of that nutrient for the condition, and a multiplier If the user has requested the controller 50 to only provide the user with a machine-readable form of the recipe, or if the user commands the controller 50 in any other suitable way, the step of actuating the food processing module 66 to produce the selected serving may be carried out at a time or place different to the time or place the user initiates the order. This allows the user to place an order and agree to a recipe at one place or time, and to have the serving prepared and dispensed at another place or time.

General Description of the Invention

An apparatus forming an embodiment of the system of this invention is a point-of-sale foodstuff preparing and dispensing device (vending machine). Payment may be affected by means displaced in time and place from where the serving is eventually dispensed.

Broadly, the device consists of a set of compartments, or storage modules, where a set of ingredients is held, an ingredient processing module that takes selected quantities of at least two ingredients and processes them by the application of at least one processing technique known in the art of food processing, a control system, a real or virtual customer interface and a means of dispensing the prepared serving to the customer.

If the customer places an order via a virtual interface, for example a remote computer terminal or phone, or device connected by a communication link, the device may provide the customer with an access number, or code, to release the foodstuff when the preparation device is visited for its collection. For such orders, in addition to the access code, the customer may be provided with information on where to find the location of a device from which the product can be dispensed.

For remotely ordered products, the device may begin preparing the foodstuff ordered by the customer once payment has been made. Alternatively preparation begins once the customer has made contact (via a recognition code) with the particular device from which the foodstuff is to be dispensed. Alternatively, the customer may specify or indicate a time for preferred dispensing.

In one aspect, the controller may solicit selection preferences from the customer by either graphical or vocal means, optical means or a set of mechanical selection devices e.g. switches or buttons. By way of non-limiting example, if the user interface is graphical (such as an interactive display screen) the user's preferences may be indicated by a variety of methods, of which ticking check boxes for some or all of the options presented is an example.

In another embodiment, a portfolio (menu) of choices may be offered the customer via an interactive display screen or a vocal medium who is prompted to indicate his/her choices. For example, for protein options, select (or press) 2; for mineral supplementation options, select (or press) 3; for vitamin enhancement options, select (or press) 4; low carbohydrate/glycaemic index (GI) options select (or press) 5, etc. Within each class of choice, further sub-menus may be presented for the customer to respond with a preference. From the final selections made by the customer, the device may ask for confirmation and will analyse the information and make a final ingredient selection that attempts to maximise the overall benefit to the customer. With each user selection, at least two customised product possibilities can arise. With for example $3^3$ possible choices, the degree of customisation possible is that every currently living individual could be tailored a different product.

The controller may deploy a variety of methods to process the information received from the customer. Methods may be digital or analogue or combinations of the two, use logic gates (that are well know in the art of network analysis and operation), linear algebra and linear programming and the techniques known to those skilled in the art of operations research and applied mathematics. The means of information analysis and processing may use combinations of hardware and software. For example logic or decision tree analysis may be conducted using logic gate devices such as AND and OR gates, or may be conducted using software programs such as in the form of 'IF' statements and known logic algorithms. Algorithms that are capable of making resource allocation decisions based on optimisation techniques may be used. Such algorithms are known in the arts of operations research and applied mathematics.

In a non-limiting embodiment, preferences made by the customer as indicated by the two possible states of a choice selection e.g. a check-box, may be mathematically coded as either a 0 or 1. A useful category of linear programming known as integer programming is able to make use of variables that are confined to the limited states of 0 or 1. This allows ingredient combinations to be optimised with the presence of such variables. Of particular use is the art of combining linear variables (e.g. expressing quantities of possible ingredients) with integer variables in linear programming (e.g. expressing customer preferences) and the solution and optimisation of a set of such mixed-integer variables (Winston W. L., Operations Research—Applications and Algorithms. $3^{rd}$ ed. Duxbury Press, Belmont, Calif.).

In a further aspect the customer and the device may interact using synthetic voice production and voice recognition techniques.

The controller has access to current information regarding the composition and available quantities of all the ingredients contained in the ingredient and fortificant storage modules. The controller has access to at least one recipe for a serving that the processing module can prepare, the extent to which ingredient substitution is possible and limits on the extents of fortification or supplementation permissible.

The controller may have access to limits placed by regulation on the compositional characteristics of the prepared serving. For instance, Australia New Zealand Food Authority (ANZFA) administers food standards and legislation within its jurisdiction. The food classification Formulated Meal Replacements and Formulated Supplementary Foods (ANZFA Standard 2.9.3) imposes constraints of food compositions. A formulated meal replacement must contain no less than 12 g of protein in a serving; a formulated supplementary food for young children must contain no less than 2.5 g protein in a serving. ANZFA Standard 2.9.4 regulates the composition of Formulated Supplementary Sports Foods. A label that complies with the legislation must be prepared and applied.

The device may include a printing device capable of applying a customised label for the prepared foodstuff. This gives the customer a take away record to assist in making future choices.

As the customer makes choices, the controller may send information back to the user interface (e.g. interactive display screen) showing the nutritional composition of a serving. The nutritional display may include the quantities of fat, protein, carbohydrate, minerals and vitamins etc. in the selected serving, the percentage of the recommended daily intake (RDI) of nutritional components in the serve compared with national advisory guidelines, and the quantities of nutritional components per 100 g in the selected serving. On the basis of such nutritional information presented to the customer, further selection choices may be made by the customer to tailor the foodstuff to his/her requirements. The nutritional information displayed to the customer may include warnings that the selected serving is outside sound nutritional guidelines e.g. exceeds 100% RDI for vitamin D, for instance. The same or similar information may be printed on the label applied to the dispensed product.

The device may, where required, contain a cleaning system. The cleaning system may be self-contained and be operated by the controller. Such systems are often known as 'clean-in-place' systems and are well known in the food processing art.

The ingredient processing module accepts specified quantities of two or more ingredients from the ingredients module according to instructions from the controller. The processor may perform a sequence of tasks to convert the ingredients into the serving ordered by the customer. The ingredients may then be dispensed in sequence under instruction by the controller. The tasks performed within, or by, the ingredient processing module need not be limited to, but can include at least one of the operations of—shearing, dispersing, homogenising, heating, cooking, baking, fermenting, pasteurising, heat treating, cooling, freezing, thawing, extruding, filtering, percolating, brewing, grinding, coagulating, whipping, aerating, hydrating, kneading.

The controller may engage with the customer via the user interface at various stages during its sequence of operations by requesting a customer response or choice to be made e.g. what temperature would you like your serving (such as a hot heated beverage) to be dispensed at. The user interface may offer the customer a selection of temperatures from which a choice is requested—e.g. 50-60° C., 60-70° C., 70-80° C., 80-90° C., >90° C.

The user is able to prepare a unique serving to their requirements (tastes or wants). The user may want to reorder that specific formulation on future occasions. It is an aspect of this invention that the system retains no specific information revealing the identity of the user. In one embodiment, this may be achieved by recording the requested formulation along with a unique product number in a database or data array. Optional information that may be stored along with the formulation record may be a date of original serving and the date of the most recent reordering. A unique reference code may be obtained most easily by incrementing the count of all such records previously existing in the database or data array by one. More sophisticated versions may desirably encrypt the issued record number. Known encryption functions can be used readily. The unique reference code may be conveyed to the user by any convenient means that offers a permanent or semi permanent record. The database of formulations may be managed by normal commercial means, whereby records that have not been accessed for an extended period may be routinely culled.

In another aspect, a user engaging the system via a remote communication device e.g. phone or computer, at some appropriate stage during the product ordering process, may be presented with information revealing the location of neighbourhood dispensing terminals, or the nearest available dispenser. The location of the user relative to the dispenser locations may be inferred for instance by cell receiver triangulation methods, or GPS methods if built into the communication device. Optionally, location information may be given by the user (map grid reference, suburb, street name, building name, campus etc.). For users communicating with the system via the internet, further information regarding the user's communication device, and therefore the user, may be obtained by noting that each device connected to the internet has a unique DNS (domain name server) address.

In another aspect, the system has a resources management database or file that contains the current levels of all the ingredients for each dispenser. When a user initially interacts with the ordering system, a check may be conducted to ensure that only those base recipes are offered that can be fulfilled from available ingredient stocks e.g. to avoid user frustration when the coffee ingredient is insufficient to provide a coffee beverage, this option is automatically eliminated from the display of available base products offered to the user. Similarly, when stocks reach some predefined threshold, an alert may be sent to the system manager. Further stock level checking may be conducted at any convenient stage after the user has made a selection that engages an increased ingredient requirement. When the dispenser prepares the user's product, the stock resource database is updated with the respective ingredient usages.

Nutritional Calculation Algorithm

Each available ingredient (a) within the device has a known nutritional component (b) of content (x) e.g. % protein, % fat, % calcium, % vitamin B1, or any other nutritionally identified component. This information may be represented in the device by a matrix (B) of the mathematical form—

$$\begin{bmatrix} b_1 b_2 b_3 b_4 \ldots \\ a_1 x_{11} x_{12} x_{13} x_{14} \ldots \\ a_2 x_{21} x_{22} x_{23} x_{24} \ldots \\ \vdots \\ \vdots \end{bmatrix}$$

The selected recipe may be represented for the quantities (y) of each of the ingredients required (a) using the same notation by a second matrix (Y)—

$$\begin{bmatrix} a_1 & y_1 \\ a_2 & y_2 \\ \vdots \\ \vdots \end{bmatrix}$$

The composition of the resulting serving ordered by the customer is found as the product of the matrices—

$$\begin{bmatrix} b_1 b_2 b_3 b_4 \ldots \\ a_1 x_{11} x_{12} x_{13} x_{14} \ldots \\ a_2 x_{21} x_{22} x_{23} x_{24} \ldots \\ \vdots \\ \vdots \end{bmatrix} \times \begin{bmatrix} a_1 & y_1 \\ a_2 & y_2 \\ \vdots \\ \vdots \end{bmatrix} = \begin{bmatrix} b_1 b_2 b_3 \ldots \\ a_1 x_{11} y_1 x_{12} y_1 x_{13} y_1 \ldots \\ a_2 x_{21} y_2 x_{22} y_2 x_{23} y_2 \ldots \\ \vdots \\ \vdots \end{bmatrix}$$

The total quantity of each nutritional component ($b_T$) may be thus found by summation of the column elements—

$$\begin{bmatrix} b_{T1} = \sum x_{11} y_1 + x_{21} y_2 + x_{31} y_3 \ldots \\ b_{T2} = \sum x_{12} y_1 + x_{22} y_2 + x_{32} y_3 \ldots \\ \vdots \\ \vdots \end{bmatrix}$$

Food labelling regulations may prescribe a daily value (DV) or a recommended daily intake (RDI) for one or more of the nutritional components of the serving. The set of DV and RDI values may be represented as the matrix (Z)—[$z_1$ $z_2$ $0_3$ $z_4$ $z_5$ ...] where the z subscripts correspond with the subscripts of the b column series (of matrix B). For some of the b elements there is no set daily intake prescribed e.g. $0_3$. The z series may be adjusted or revised according to the regulation.

Different sets of values may be stored in a table or database and the appropriate series read according to the regulation programmed into the device. Units of the z series are typically grams per day, milligrams per day or micrograms per day determined according to the nutritional component (b) concerned. The z series also may depend on the age of the recipient, or other customer attributes e.g. sex. Different z values are prescribed for infants and adults, for example, and generally the adult values would be selected, but the customer may be given a choice to select the appropriate series. Often food labelling regulations prescribe rules for the rounding of the quantities of the components in a serving and the % DV values e.g. USA. These rules may be programmed into the calculation according to the applicable food regulation.

The consumer may be presented with a display or food label with at least one nutritional component in the serving expressed as a percentage of the DV or RDI, which is often and conveniently expressed in table or matrix form—

$$\begin{bmatrix} b_1 & b_{T1} \div z_1 \times 100 \\ b_2 & b_{T2} \div z_2 \times 100 \\ b_3 & 0 \\ b_4 & b_{T4} \div z_4 \times 100 \\ \vdots & \\ \vdots & \end{bmatrix}$$

$b_1$ and $z_1$ may correspond to the protein content and DV for protein in an adult diet of the serving, $b_2$ and $z_2$ the calorie content and DV of the serving, $b_3$ and 0 the water content and DV of the serving (for which no DV or RDI is defined), and $b_4$ and $z_4$ the vitamin C content and RDI of the serving, respectively. The customer may examine this nutritional information and as a result may wish to alter the order and a revised table of nutritional information is calculated. The customer may be satisfied with the existing or revised nutritional information and decide to execute the preparation of the serving, or may wish to make further changes/selections to the order.

In a second aspect the price for the ordered serving may be calculated for any customer selection if each of the ingredients is assigned a price. A matrix (D) of individual ingredient prices $$\begin{bmatrix} a_1 & d_1 \\ a_2 & d_2 \\ \vdots & \\ \vdots & \end{bmatrix}$$

may be used where the values (d) have units, for example, $/kg. The price for any formulation selected by the customer can be calculated and displayed by multiplying the matrices Y×D and summing the elements—

$$= \sum_{1}^{n} y_1 d_1 \ldots y_n d_n.$$

The price displayed and charged to the customer, may be the price calculated above as the sum-product of the Y×D matrices plus a machine service charge, times any taxes levied, times a profit margin. Note that the values representing the compositions of the ingredients (B matrix), the ingredient prices (D matrix) and any taxes and profit margin can be set independently of any customer interaction with the device and hence for a specific customer-device interaction can be represented as constants. The price is a linear function of the Y matrix. For complex formulations where more than one combination of ingredients can meet the customer's nutritional requirements, the cost of the serving can be minimised using methods known in the art of operations research and linear algebra to solve the set of linear equations for the lowest cost formulation.

Examples of beverage servings and a baked product prepared by the system of the invention are given below.

EXAMPLE 1

Illustration of an Embodiment of Customer Interface and Engagement

Figure 3:
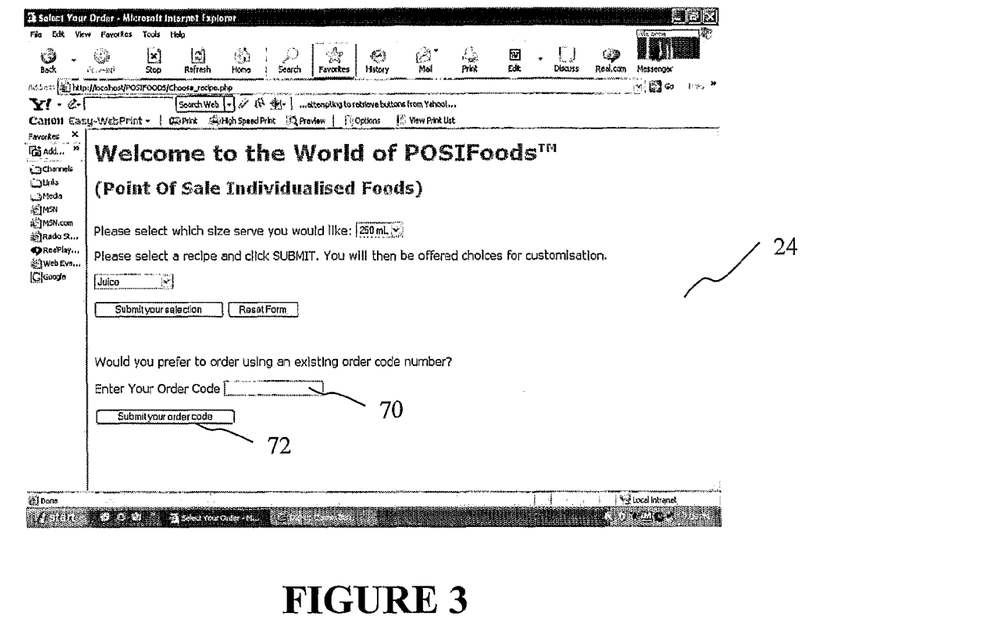
FIGS. 3 to 7 show the use of an example user interface and mode of user engagement.

FIG. 3 shows a possible means of engagement by a user with the user interface 24. The user is offered a choice of product options (recipes) e.g. hot chocolate, juice, coffee for which the system has sufficient ingredient resources to fulfil e.g. juice. (If an ingredient required for a recipe is lacking or insufficient, those recipes or ingredients are not offered to the user. This calculation can be rerun at any convenient stage of the process of user engagement.) The user is offered to make a selection of a preferred serving size e.g. 250 mL. Any user selection method may be used such that the user can only select a single recipe/product and a single serving size at a time. A drop-down list box is one embodiment that ensures only a single selection is possible. Alternatively, the user (who is a previous user of the system) may opt to bypass making a recipe/product and serving size selection, and enter coded information, such as a unique product code character sequence or number in the requested form entry field 70 in the lower screen. Once the appropriate choices have been made the user engages the submit tab/key 72. The user may be given the option to change their selection before submitting.

Figure 4:
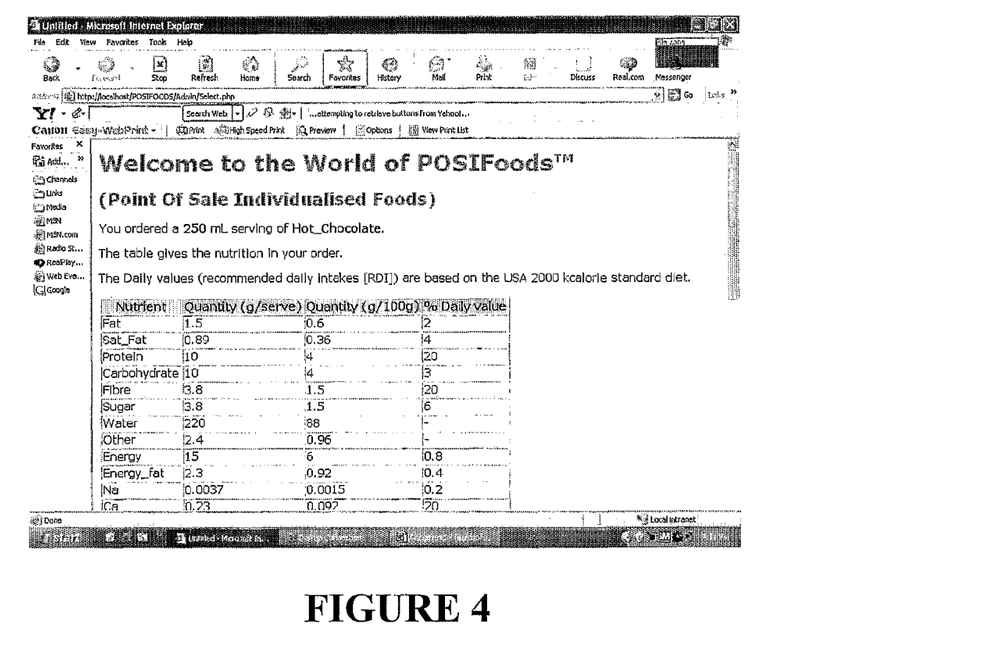

FIG. 4 shows part of the response arising from the user's submitted selection. The recipe/product and serving size are confirmed along with the nutritional information relating to the selections. Any degree of detail of nutritional content may be presented.

Figure 5:
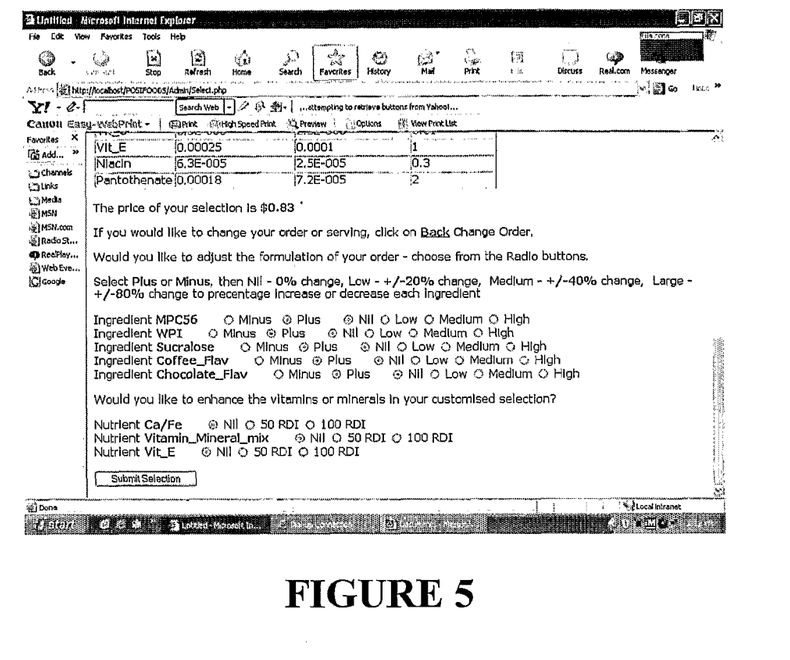

FIG. 5 shows the lower portion of the screen of FIG. 4. The price of the selection is displayed along with the ingredients available for user customisation. The user is requested to make selections to tailor the product to their taste or wants. In addition, a number of nutritional supplementation ingredient selections (fortificants 14 in FIG. 1) are also offered for which the user can make selections. The offered ingredients and fortificants may be customised to any practical extent, along with the extent of selectivity within each ingredient choice.

The user's tastes may include flavour, nutrition or price or any combination thereof according to the user's inclination. FIG. 5 shows radio buttons as the means of making specific selections. Any selection means may be used including slider controls which permit selections over continuous ranges between defined limits.

Ingredients may be identified or named in any convenient fashion to facilitate user engagement and selection making. For example Ingredient WPI may be identified as "Concentrated protein for muscle building", Ingredient Sucralose may be identified as "Low calorie sweetener" etc.

Figure 6:
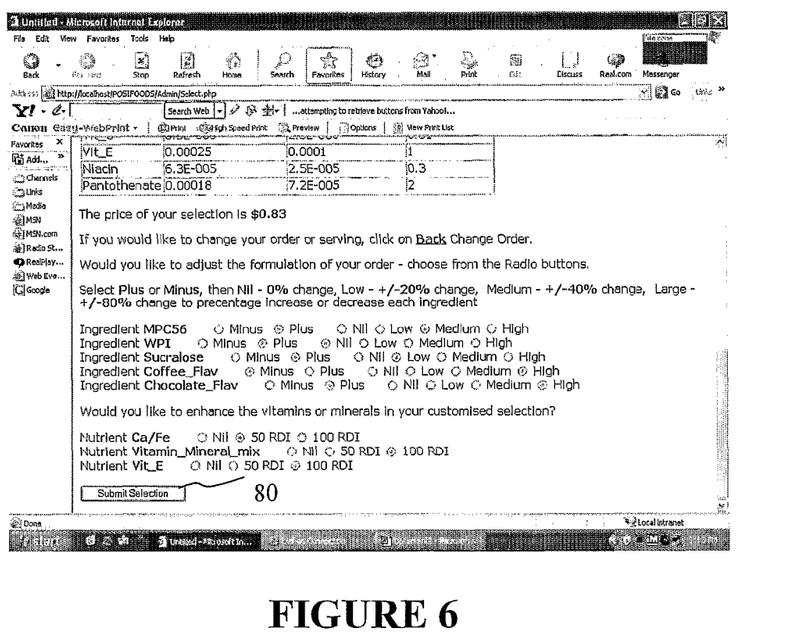

FIG. 6 shows the customisation selections made by the user. Having made a set of customisation choices, the information is submitted by the user by engaging the submit selection button/key 80.

Selection Ranges

Limits can be placed on the maximum and minimum levels of addition for each ingredient or fortificant. These may be different for each recipe/product. Considerations that may define these limits are stability or acceptability of the prepared product or the avoidance of unfavourable organoleptic outcomes. For instance, a product that is naturally bitter, e.g. coffee, can accommodate higher levels of addition of any ingredient or fortificant that may be bitter compared with, for example, a vanilla flavoured smoothie. These aspects may be generalised to cater for any undesirable product/customer/ingredient interaction that may be detrimental to user satisfaction.

Selection Optimisation

Sometimes it is not feasible to deliver to the user exactly what they either desire or have selected. Consider FIG. 6 where the user is invited to select a level of addition of a vitamin/mineral mix. Such mixtures of vitamins and minerals (or combinations of vitamins alone, or mineral mixes alone) are widely sold currently as tablets or capsules for people to consume. Such a mixture of nutritional components can be readily accommodated as a fortificant in the preparation of products of this invention. However some constraints arise because of the number of degrees of freedom are limited in the ability to deliver a dose of any particular nutritional component e.g. niacin or zinc. More specifically, a vitamin/mineral mix can be formulated with a preferred blend of its active constituents to meet exactly the recommended daily intakes specified in recommended national nutritional guidelines, or any other basis, e.g. USA 2000 Calorie standard diet. However some of the other ingredients in the selected composition may already include amounts of some of the active components of the nutritional mixture e.g. carotene/Vitamin A in milkfat and riboflavin in various milk/dairy ingredients, or calcium associated with various milk protein sources. An algorithm is required to most nearly meet any such nutritional dose conflicts. In the embodiment shown in FIG. 6, the customer has selected 100% Recommended Daily Intake (RDI) for the Vitamin-Mineral Mix ingredient option. For each component of the Vitamin-Mineral Mix ingredient (vitamin B1, B2, B6 etc, calcium, iron, zinc etc.), the quantity of the Vitamin-Mineral Mix ingredient is calculated to satisfy the user's RDI requirement by taking into account the contributions provided from all the other ingredients for the selected formulation. The set of quantities required of Vitamin-Mineral Mix ingredient are placed in an array and sorted according to the quantity. In the example shown in FIG. 6, the middle element of the array was selected. Using this selected value, the overall nutritional table is then calculated (and the formulation for preparation of the product to be dispensed) is then presented to the user in FIG. 7. It is noted that the component (zinc) most closely matches the 100% RDI/Daily value target and that other components range from 60% (vitamin B6) to 120% (magnesium) Daily Value. A wide variety of algorithms may be used to determine ingredient quantities subject to constraints. Linear programming methods are known in the art.

Figure 7:
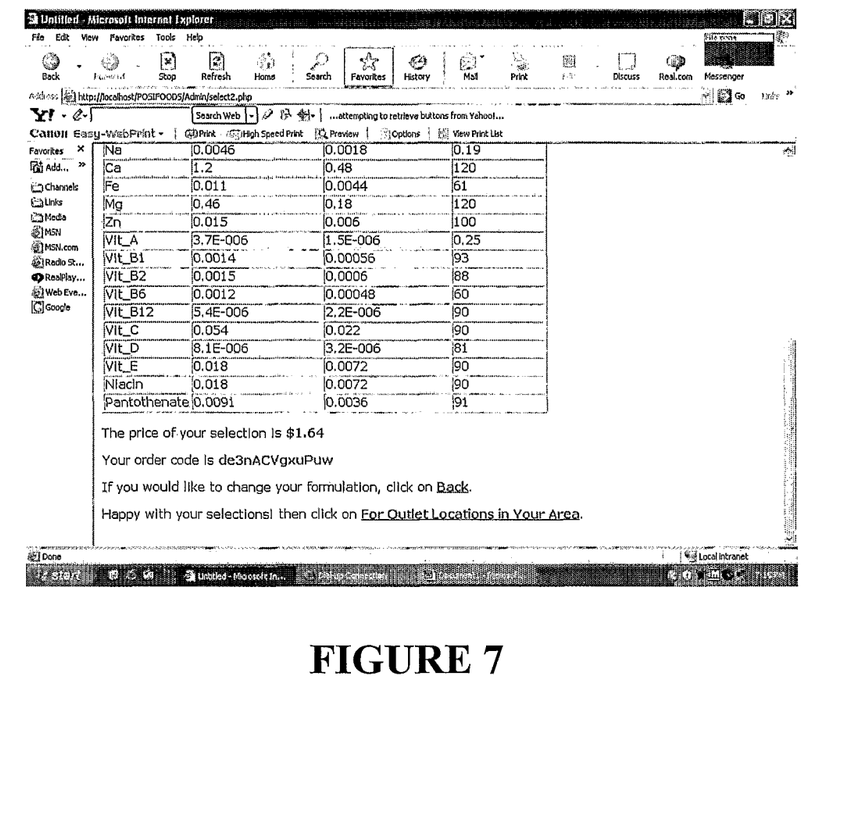

FIG. 7 shows the nutritional content of the customised selections submitted by the user, and the revised/updated price of the selected formulation. The user is offered the option to go back and make further adjustments to their selection as they feel inclined. The customer is given a unique order code number, which may be used at some future time to order this specific formulation or to have this particular formulation prepared at a particular dispenser of the user's choosing of time or place. The order code may be presented on the billing receipt or on the package of the served product or any other convenient means by which an enduring record can be presented to the user. The payment or billing function may be engaged at this point, or when the product is about to be dispensed at the dispenser (if separated/remote from the customer engagement screen 24 of FIG. 1 e.g. internet). In an embodiment shown in FIG. 7, the user is able to select a screen that shows the location of dispensers in their locality. The location of nearby dispensers may be presented as an option on the initial user engagement screen (if the user is at a remote location) so that stock levels at a specific dispenser can be confirmed prior to the user making a recipe selection and during the course of product customisation.

User Formulation Database

In another aspect, a database records all users' final formulations and provides the user with coded information, such as a unique product access code, that enables the user to directly "dial up" a previous product. This avoids users having to remember what series of selections they made previously for a product that they particularly enjoyed. Information recorded in the database is the unique access code, the ingredient recipe and serve size ordered. Other information may be the date of the original order and the date of the most recent use of the recorded formulation. Formulations that have not been accessed for a period may be routinely deleted according to normal commercial system management criteria.

Stock Control Database

The system is fitted with a stock control database that records the name and quantity of each ingredient held in each dispensing device. Each time a recipe is vended, the stock inventory is debited with the quantity of each ingredient consumed. Other information that may be included is use-by dates, warning levels, supplier information, batch identification and the like. The stock control database may be interrogated at various stages of user engagement with the ordering and selection process to ensure that only feasible selections are transacted.

Means and mechanisms to dispense the specified ingredients and prepare and vend the customised product are revealed in WO2005/111955.

EXAMPLE 2

Nutritional Coffee Beverage

A (female) (United States) customer selects a coffee beverage fortified with added milk protein, calcium and iron, folic acid and a medium fortification with multi-vitamins (including a vitamin E supplement).

The selected coffee beverage is formulated using the recipe shown in Table 1.

TABLE 1

Formulation recipe of user selected beverage product

| Ingredient | Quantity (g) |
|---|---|
| Milk Protein Concentrate (ALAPRO ™, 4560 Fonterra Co-operative Group Ltd. Auckland) | 35.03 |
| Base vitamins, fibre and minerals | 7.0 |
| Vitamin E diluted with maltodextrin | 0.3 |
| Folic acid (BASF) with maltodextrin | 0.3 |
| Calcium lactate + ferrous sulphate with maltodextrin | 4.22 |
| Sucralose (5% solution) | 0.3 |
| Coffee flavour | 3.0 |
| Hot water | 350.0 |
| Total | 400.0 |

The customer is provided in Table 2 with the nutritional information for the beverage to be prepared according to the recipe of Table 1.

TABLE 2

Nutritional composition of user selected recipe

| Component | Quantity per serve (g) | Percentage of recommended daily intake based on USA adult standard diet |
|---|---|---|
| Energy (kcal) | 167 | 8 |
| Protein | 20.2 | 40 |
| Carbohydrate (excluding fibre) | 15.6 | 7 |
| Fat | 0.5 | <1 |
| Vitamin B1 | 0.38 mg | 25 |
| Vitamin B2 | 0.43 mg | 25 |
| Vitamin B6 | 0.5 mg | 25 |
| Niacin | 5.0 mg | 25 |
| Pantothenate | 2.5 mg | 25 |
| Vitamin B12 | 1.5 μg | 25 |
| Vitamin C | 15 mg | 25 |
| Vitamin D | 2.5 mg | 25 |
| Folate | 100 μg | 25 |
| Vitamin E | 5.0 mg | 25 |
| Calcium | 1.0 g | 102 |
| Zinc | 5.9 mg | 39 |
| Magnesium | 138 mg | 34 |
| Sodium | 88 mg | <5 |
| Iron | 4.7 mg | 26 |

The customer opts to confirm and proceed with the formulation of Table 1 and the nutritional information of Table 2. After payment is confirmed, the order is prepared and dispensed.

EXAMPLE 3

Fortified Juice

A juice beverage is selected with a high level of added whey proteins and a medium level of multi-vitamin supplementation, by an (Australian) customer and prepared and dispensed using the recipe shown in Table 3.

TABLE 3

Formulation recipe of user selected beverage product

| Ingredient | Quantity (g) |
|---|---|
| Whey protein concentrate (ALACEN ™ 894, Fonterra Co-operative Group Ltd. Auckland) | 125 |
| Base vitamins, fibre and minerals | 7 |
| Vitamin E diluted with maltodextrin | 0 |
| Folic acid (BASF) with maltodextrin | 0 |
| Calcium lactate + ferrous sulphate with maltodextrin | 0 |
| Sucralose (5% solution) | 0 |
| Coffee flavour | 0 |
| Apple juice concentrate (70 Brix) | 68.8 |
| Cold water | 199 |
| Total | 400.0 |

The customer is provided in Table 4 with the nutritional information for the beverage to be prepared according to the recipe of Table 3.

TABLE 4

Nutritional composition of user selected recipe

| Component | Quantity per serve (g) | Percentage of recommended daily intake based on FSANZ adult standard diet |
|---|---|---|
| Energy (kcal) | 299 | 15 |
| Protein | 25.1 | 50 |
| Carbohydrate (excluding fibre) | 39 | 12.6 |
| Fat | 0.1 | <1 |
| Vitamin B1 | 0.38 mg | 34 |
| Vitamin B2 | 0.43 mg | 25 |
| Vitamin B6 | 0.5 mg | 31 |
| Niacin | 5.0 mg | 50 |
| Pantothenate | 2.5 mg | 50 |
| Vitamin B12 | 1.5 μg | 75 |
| Vitamin C | 300 mg | 740 |
| Vitamin D | 2.5 μg | 25 |
| Folate | 0 | 0 |
| Vitamin E | 0 | 0 |
| Calcium | 250 mg | 31 |
| Zinc | 3.8 mg | 31 |
| Magnesium | 116 mg | 36 |
| Sodium | 61 mg | <5 |
| Iron | 0 | 0 |

The customer, after examining the nutritional description of Table 4, is concerned with the high level of protein fortification (50% of DV) and also concerned with the price, then opts to revise the formulation to give a medium level of protein fortification. Table 5 shows the revised recipe.

TABLE 5

Revised formulation recipe of user selected beverage product

| Ingredient | Quantity (g) |
|---|---|
| Whey protein concentrate (ALACEN ™ 894, Fonterra Co-operative Group Ltd. Auckland) | 65 |
| Base vitamins, fibre and minerals | 7 |
| Vitamin E diluted with maltodextrin | 0 |
| Folic acid (BASF) with maltodextrin | 0 |
| Calcium lactate + ferrous sulphate with maltodextrin | 0 |
| Sucralose (5% solution) | 0 |
| Coffee flavour | 0 |
| Apple juice concentrate (70 Brix) | 68.8 |
| Cold water | 259 |
| Total | 400.0 |

The revised nutritional information is shown in Table 6.

TABLE 6

Revised nutritional composition of user selected recipe

| Component | Quantity per serve (g) | Percentage of recommended daily intake based on FSANZ adult standard diet |
|---|---|---|
| Energy (kcal) | 299 | 15 |
| Protein | 13.1 | 27 |
| Carbohydrate (excluding fibre) | 39 | 12.6 |
| Fat | 0.1 | <1 |
| Vitamin B1 | 0.38 mg | 34 |
| Vitamin B2 | 0.43 mg | 25 |
| Vitamin B6 | 0.5 mg | 31 |
| Niacin | 5.0 mg | 50 |
| Pantothenate | 2.5 mg | 50 |
| Vitamin B12 | 1.5 μg | 75 |
| Vitamin C | 300 mg | 740 |
| Vitamin D | 2.5 μg | 25 |
| Folate | 0 | 0 |

TABLE 6-continued

Revised nutritional composition of user selected recipe

| Component | Quantity per serve (g) | Percentage of recommended daily intake based on FSANZ adult standard diet |
|---|---|---|
| Vitamin E | 0 | 0 |
| Calcium | 250 mg | 31 |
| Zinc | 3.8 mg | 31 |
| Magnesium | 116 mg | 36 |
| Sodium | 61 mg | <5 |
| Iron | 0 | 0 |

The customer, now happy with the formulation and the price, then executes the order, fulfils payment and the foodstuff is prepared and dispensed.

EXAMPLE 4

Customised 'Smoothie'

In a further non-limiting example, a (American) customer selects a fruit 'smoothie' with added multi-vitamins and a dose of Omega-3 polyunsaturated fat at a dispensing machine near the customer's workplace in Manhattan, N.Y. The recipe is shown in Table 7.

TABLE 7

Formulation for selected smoothie product

| Ingredient | Quantity (g) |
|---|---|
| Whey protein concentrate (ALACEN ™ 894, Fonterra Co-operative Group Ltd. Auckland) | 44 |
| Base vitamins, fibre and minerals | 7 |
| Omega 3 concentrate | 1.2 |
| Exotic flavours | 0.28 |
| Apple juice concentrate (70 Brix) | 51.52 |
| Cold water | 296 |
| Total | 400.0 |

The nutritional information is shown in Table 8.

TABLE 8

Nutritional composition of user selected smoothie recipe

| Component | Quantity per serve (g) | Percentage of recommended daily intake based on USA adult standard diet |
|---|---|---|
| Energy (kcal) | 316 | 16 |
| Protein | 25.3 | 51 |
| Carbohydrate (excluding fibre) | 51.8 | 17 |
| Fat | 0.9 | <5 |
| Vitamin B1 | 0.38 mg | 25 |
| Vitamin B2 | 0.43 mg | 25 |
| Vitamin B6 | 0.5 mg | 25 |
| Niacin | 5.0 mg | 25 |
| Pantothenate | 2.5 mg | 25 |
| Vitamin B12 | 1.5 µg | 25 |
| Vitamin C | 226 mg | 376 |
| Vitamin D | 2.5 mg | 25 |
| Vitamin A | 130 µg | 9 |
| Vitamin E | 5.0 mg | 25 |
| Calcium | 0.9 g | 91 |
| Zinc | 6.4 mg | 42 |
| Magnesium | 151.3 mg | 38 |
| Sodium | 109.5 mg | <5 |
| Iron | 0.1 mg | <1 |

The customer opts to confirm the formulation of Table 7 and the nutritional information of Table 8, but only wants the fruit smoothie to be later prepared or prepared at another location. For instance, the customer may want the fruit smoothie to be made fresh at a dispensing device near the customer's gymnasium at Brooklyn, N.Y. later that evening.

Preferably, once payment is made, the customer provides a smart card on which the dispensing device in Manhattan saves the customer's confirmed formulation. In this way, the customer can simply insert the smart card into an appropriate dispensing machine in Brooklyn later in the day to have the selected fruit smoothie prepared. Alternatively, payment can be made at the dispensing machine in Brooklyn. In any case, provided payment is confirmed, the customer's order is prepared and dispensed from the machine in Brooklyn.

EXAMPLE 5

Fortified Bread

A baked product can be formulated and prepared that meets the specific nutritional requirements of a customer. The customer requests a gluten-free bread with enhanced minerals and low sodium. The selected formulation is shown in Table 9.

TABLE 9

Formulation of gluten-free bread (raw)

| Ingredient | Quantity (g unless otherwise stated) |
|---|---|
| Egg powder | 35 |
| Cider vinegar | 15 mL |
| Olive oil | 60 mL |
| Honey | 60 mL |
| Buttermilk powder | 35 |
| Potassium chloride | 25 |
| Xanthan gum | 20 |
| Cornstarch | 45 |
| Potato starch | 70 |
| Soy flour | 45 |
| Rice flour | 315 |
| Active dry yeast | 10 |
| Trace minerals mixture | 8 |
| Water | 125 mL |

The customer is presented with the nutritional information shown in Table 10, which is based on the expected composition of the baked product for which a reduction of moisture content from about 43% to 37% during baking was allowed.

TABLE 10

Nutritional composition of user selected (baked) bread

| Component | Quantity per 30 g slice (g unless otherwise stated) | Percentage of recommended daily intake based on USA adult standard diet |
|---|---|---|
| Energy (kcal) | 82 | 4 |
| Protein | 2.2 | 4 |
| Carbohydrate (including fibre) | 12.7 | 4 |
| Complex carbohydrate | 9.2 | 5 |
| Fat | 2.5 | 4 |
| Calcium | 18.5 mg | 2 |
| Zinc | 3.0 mg | 20 |
| Magnesium | 76 mg | 19 |
| Sodium | 16.4 mg | <1 |
| Iron | 4.3 mg | 24 |
| Potassium | 490 mg | 14 |

TABLE 10-continued

Nutritional composition of user selected (baked) bread

| Component | Quantity per 30 g slice (g unless otherwise stated) | Percentage of recommended daily intake based on USA adult standard diet |
| --- | --- | --- |
| Selenium | 16 μg | 23 |
| Copper | 0.4 mg | 22 |
| Chromium | 22 μg | 18 |
| Molybdenum | 14 μg | 18 |

The customer is satisfied with the nutritional content information and accepts the order, fulfils payment, whereupon the selected ingredients are dispensed into a breadmaker in the sequence recommended by the breadmaker's instruction manual. After mixing, ingredient hydration, warming, fermenting, kneading and baking, a loaf of nutritional bread of approximately 1 kg is removed from the baking device.

The foregoing describes the invention including preferred forms thereof. Alterations and modifications as will be obvious to those skilled in the art are intended to be incorporated within the scope hereof, as defined by the accompanying claims.

What I claim is:

1. A system for dispensing a customised serving which comprises:
    an ingredient storage module,
    an ingredient processing module,
    a serving dispenser,
    a user interface,
    a formulation database containing an inventory of ingredients stored in the storage module and potential servings to be formulated therefrom, the ingredients associated with one or more nutritional components, and
    a controller, operatively linked to the storage module, the processing module, the dispenser, the interface and the database;
    the controller being programmed:
        i) to interrogate a user through the interface to make a serving selection, and to receive the selection made,
        ii) to interrogate the database to determine a serving recipe that best approximates the customer selection,
        iii) to determine the total quantity of one or more nutritional components within the serving recipe at least partly from a product of matrices representing the respective nutritional components and quantities of the ingredients within the determined recipe;
        iv) to present the recipe and nutritional component(s) as determined to the user through the interface with the options of accepting or refining the user selection,
        v) if the user chooses the refining option to repeat steps (i) to (iv), and
        vi) if the user chooses the accepting option, to actuate the processing module to prepare, and the serving dispenser to dispense a serving prepared from the accepted serving recipe.

2. The system as claimed in claim 1 wherein the ingredient processing module and the serving dispenser are integral with one another.

3. The system as claimed in claim 1 wherein the serving dispenser is at least partly operated by a customer or by an operator.

4. The system as claimed in claim 1 wherein the user interface is at a location remote from the other components of the system.

5. The system as claimed in claim 4 wherein, when a user has accepted a serving recipe, the controller sends a serving specific identifier to the user to be used to release a serving from the serving dispenser.

6. The system as claimed in claim 5 wherein the controller also sends to the user the location of the nearest dispensing machine.

7. The system as claimed in claim 1 wherein the serving recipe presented to a user includes information about the nutritional values of the ingredients or formulations chosen.

8. The system as claimed in claim 1 wherein the controller is programmed to select ingredients to formulate a serving optimised to meet nutritional requirements within the constraints of other requirements.

9. The system as claimed in claim 8 wherein the other requirements include one or more of the following requirements: that certain ingredients are not included together at incompatible levels, that the serving comprises sufficient but not excessive liquid ingredients in a way that departs as little as possible from nutritional targets, that the serving matches as closely as possible the customer's preferred flavour choices, and that the serving is as inexpensive as possible.

10. The system as claimed in claim 1 wherein the ingredient storage module comprises a plurality of storage compartments.

11. The system as claimed in claim 10 wherein some of the compartments contain powdered ingredients such as dairy powders or flour or other grain based food product.

12. The system as claimed in claim 10 wherein some of the compartments contain stabilisers, hydrocolloids or emulsifiers.

13. The system as claimed in claim 10 wherein some of the compartments contain condiments such as spices, herbs or salt.

14. The system as claimed in claim 10 wherein some of the compartments contain nutrients such as vitamins, minerals or bioactives.

15. The system as claimed in claim 10 wherein some of the compartments contain flavourings or flavour modifiers.

16. The system as claimed in claim 10 wherein some of the compartments contain texturing ingredients.

17. The system as claimed in claim 10 wherein some of the compartments contain liquids such as water, juice, milk or other potable liquids.

18. The system as claimed in claim 10 wherein some of the compartments contain gels or emulsions.

19. The system as claimed in claim 10 wherein some of the compartments contain dried fruit or vegetables, or fruit or vegetable extracts.

20. The system as claimed in claim 10 wherein some of the compartments are chilled or frozen.

21. The system as claimed in claim 10 wherein some of the compartments are heated.

22. The system as claimed in claim 1 wherein the ingredient storage module contains a dosing means for dosing predetermined amounts of ingredients stored in compartments into a serving.

23. The system as claimed in claim 1 wherein there is provided ingredient advancing means for moving ingredients from the ingredient storage module to the ingredient processing module.

24. The system as claimed in claim 23 wherein the ingredient advancing means is one or more of mechanical, gravity, vacuum, air pressure, and liquid pressure.

25. The system as claimed in claim 1 wherein the ingredient processing module contains one or more of a mixer, a heater, a cooler or a freezer.

26. The system as claimed in claim 25 wherein the heater is a convection heater, microwave heater, pasteuriser, irradiator, ohmic heater or high frequency sound.

27. The system as claimed in claim 1 wherein the serving dispenser is a nozzle.

28. The system as claimed in claim 1 wherein the serving dispenser is an extruder.

29. The system as claimed in claim 28 wherein the extruder is heated.

30. The system as claimed in claim 1 wherein there is provided a means for dispensing containers or other receptacles to be in registry with the dispensing nozzle to receive servings from the serving dispenser.

31. The system as claimed in claim 1 wherein the controller is operatively linked to one or more servers each having stored in its memory at least some of the inventory of ingredients in the storage module and possible servings available therefrom, and nutritional and health data relating to ingredients in the storage module and possible servings therefrom.

32. The system as claimed in claim 31 wherein the controller and/or server is operatively linked to an external database.

33. The system as claimed in claim 32 wherein the external database contains information on health and nutrition.

34. The system as claimed in claim 33 wherein the information on health and nutrition are provided in codified form, with codified values representing the amount, if any, by which a standard dose of nutrition should be increased or decreased for a particular health condition.

35. The system as claimed in claim 1 wherein the user interface is a touch panel or keyboard integral with the dispensing system.

36. The system as claimed in claim 1 wherein the user interface is a cell phone operable from a location remote from the dispensing system.

37. The system as claimed in claim 1 wherein the user interface is a customer computer operatively linked through to the internet to the system.

38. The system as claimed in claim 1 wherein the user interface is a card reader which reads information digitally or magnetically stored on a card presented by a customer.

39. The system as claimed in claim 1 wherein the controller is programmed to store the serving recipe in a machine-readable medium that is presented by the user or that is presented to the user.

40. The system as claimed in claim 39 wherein the controller is programmed to receive at least part of the serving recipe from information that is digitally or magnetically stored on a card.

41. The system as claimed in claim 1 wherein the controller is operatively linked to a billing function.

42. The system as claimed in claim 41 wherein the billing function is operatively linked to an electronic crediting/debiting system.

43. The system as claimed in claim 41 wherein the billing function is actuable by the insertion of coins, banknotes, prepaid electronic cards or the like.

44. A network comprising one or more systems as defined in claim 1 that are operatively linked to one or more network servers.

45. An apparatus for dispensing customised nutritional servings, the apparatus comprising the combination of components of the system as claimed in claim 1.

46. The system as claimed in claim 1 wherein the controller is further programmed:
   vii) to determine a serving recipe from information stored on a machine-readable medium or from coded information that is presented by the user, and
   viii) to carry out step (vi) using the serving recipe determined in step (vii).

47. The system as claimed in claim 46 wherein the controller is further programmed:
   ix) to determine, using the database, whether the ingredients required for the serving recipe determined in step (vii) are available from the storage module, and
   x) if one or more ingredients are not available, to provide the user with alternative ingredients or recipes, or to allow the user to vary the serving recipe.

* * * * *